United States Patent
Kamada

(10) Patent No.: US 10,584,785 B2
(45) Date of Patent: Mar. 10, 2020

(54) BICYCLE SPROCKET AND BICYCLE SPROCKET ASSEMBLY

(71) Applicant: Shimano Inc., Sakai, Osaka (JP)

(72) Inventor: Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 109 days.

(21) Appl. No.: 15/595,345

(22) Filed: May 15, 2017

(65) Prior Publication Data

US 2017/0370458 A1    Dec. 28, 2017

(30) Foreign Application Priority Data

Jun. 27, 2016   (JP) ................ 2016-126363

(51) Int. Cl.
| | |
|---|---|
| *F16H 55/08* | (2006.01) |
| *B62M 9/10* | (2006.01) |
| *B62M 9/124* | (2010.01) |
| *B21K 1/30* | (2006.01) |
| *B62M 9/04* | (2006.01) |

(52) U.S. Cl.
CPC .......... *F16H 55/0873* (2013.01); *B62M 9/10* (2013.01); *B62M 9/124* (2013.01); *F16H 55/08* (2013.01); *B21K 1/30* (2013.01); *B62M 9/04* (2013.01)

(58) Field of Classification Search
CPC ........ F16H 55/30; F16H 7/06; F16H 57/0006; B62M 9/10; F16G 13/06
USPC ................................................ 474/160, 152
See application file for complete search history.

(56) References Cited

U.S. PATENT DOCUMENTS

| | | | | |
|---|---|---|---|---|
| 2,259,937 | A * | 10/1941 | Klaucke .................. | F16G 13/06 474/156 |
| 2,382,740 | A * | 8/1945 | Noffsinger .............. | F16H 55/12 474/162 |
| 4,016,772 | A * | 4/1977 | Clemens ................ | B62D 55/12 474/156 |
| 4,116,081 | A * | 9/1978 | Luttrell .................. | B62D 55/12 474/156 |
| 4,148,225 | A * | 4/1979 | Redmond, Jr. ......... | F16H 7/023 474/148 |
| 4,758,209 | A * | 7/1988 | Ledvina .................. | F16G 13/04 474/156 |
| 5,397,278 | A * | 3/1995 | Suzuki .................... | F16H 55/30 474/156 |
| 5,545,096 | A * | 8/1996 | Su ........................... | B62M 9/10 474/160 |

(Continued)

FOREIGN PATENT DOCUMENTS

| | | |
|---|---|---|
| CN | 101581357 A | 11/2009 |
| JP | 06-072776 A | 3/1996 |
| JP | 2008-189254 A | 8/2008 |

*Primary Examiner* — Henry Y Liu
(74) *Attorney, Agent, or Firm* — Global IP Counselors, LLP

(57) ABSTRACT

A bicycle sprocket includes a first sprocket body and a plurality of first sprocket teeth. The first sprocket teeth include a plurality of tooth tip portions and a plurality of tooth bottom portions. The tooth bottom portions include at least one first tooth bottom portion and at least one second tooth bottom portion. The at least one first tooth bottom portion has a first tooth bottom shape. The at least one second tooth bottom portion has a second tooth bottom shape. The first tooth bottom shape is different from the second tooth bottom shape.

24 Claims, 8 Drawing Sheets

(56) References Cited

U.S. PATENT DOCUMENTS

| | | | | |
|---|---|---|---|---|
| 5,632,699 A * | 5/1997 | Nakamura | ............... | B62M 9/10 474/160 |
| 5,716,297 A * | 2/1998 | Bodmer | ................... | B62M 9/10 474/160 |
| 5,738,603 A * | 4/1998 | Schmidt | ................... | B62M 9/10 474/158 |
| 5,782,712 A * | 7/1998 | Campagnolo | ............ | B62M 9/00 474/152 |
| 5,830,096 A * | 11/1998 | Schmidt | ................... | B62M 9/10 474/156 |
| 5,876,295 A * | 3/1999 | Young | ...................... | F16H 7/06 474/156 |
| 5,876,296 A * | 3/1999 | Hsu | .......................... | B62M 9/10 474/140 |
| 5,921,878 A * | 7/1999 | Young | ...................... | F16G 13/06 474/156 |
| 6,155,943 A * | 12/2000 | Ledvina | .................... | F16H 7/06 160/152 |
| 6,340,338 B1 * | 1/2002 | Kamada | .................. | B62M 9/10 474/152 |
| 6,736,744 B1 * | 5/2004 | Wigsten | .................. | F16H 55/30 474/152 |
| 6,761,657 B2 * | 7/2004 | Young | ...................... | F16H 7/06 474/152 |
| 6,805,645 B2 * | 10/2004 | Mao | ......................... | B62M 9/10 474/152 |
| 7,108,622 B2 * | 9/2006 | Okabe | .................... | F16G 13/06 474/152 |
| 7,128,673 B2 * | 10/2006 | Kubo | ..................... | F16H 55/30 474/152 |
| 7,416,500 B2 * | 8/2008 | Young | ...................... | F16H 7/06 474/152 |
| 7,534,182 B2 * | 5/2009 | Sonoda | ................... | F16H 55/08 474/152 |
| 7,691,020 B2 * | 4/2010 | Sakura | .................... | F16H 7/06 474/152 |
| 7,740,555 B2 * | 6/2010 | Markley | ................... | F16H 7/06 474/156 |
| 7,942,771 B2 * | 5/2011 | Kamada | .................. | B62M 9/10 474/152 |
| 8,177,670 B2 * | 5/2012 | Kamada | .................. | B62M 9/10 474/155 |
| 9,500,271 B2 * | 11/2016 | Yokoyama | ............... | F16H 7/06 |
| 10,000,256 B2 * | 6/2018 | Nishimoto | ............... | B62M 9/02 |
| 2003/0073530 A1 * | 4/2003 | Mao | ...................... | B62M 9/10 474/160 |
| 2005/0079940 A1 * | 4/2005 | Reiter | ...................... | B62M 9/10 474/160 |
| 2011/0005372 A1 * | 1/2011 | Kincel | ...................... | F41A 3/72 89/1.4 |
| 2011/0053721 A1 * | 3/2011 | Kamada | .................. | B62M 9/10 474/160 |
| 2016/0101825 A1 * | 4/2016 | Braedt | ..................... | B62M 9/12 474/160 |

* cited by examiner

BICYCLE SPROCKET AND BICYCLE SPROCKET ASSEMBLY

This application claims priority to Japanese Patent Application No. 2016-126363, filed on Jun. 27, 2016. The entire disclosure of Japanese Patent Application No. 2016-126363 is hereby incorporated herein by reference.

BACKGROUND

Field of the Invention

The present invention elates to a bicycle sprocket and a bicycle sprocket assembly.

Description of the Related Art

Conventional bicycle sprockets are respectively provided on a crank assembly and a rear hub assembly. A bicycle chain is provided between a front sprocket of the crank assembly and a rear sprocket of the rear hub assembly. With this configuration, the rotation of the crank assembly is transmitted to the rear huh assembly via the chain, and a rear wheel is thereby rotated.

For example, a rear sprocket assembly is disclosed in Japanese Laid Open Application No. 2008-189254A in which the rear sprocket assembly includes a plurality of rear sprockets.

Each rear sprocket includes an annular rear sprocket body and a plurality of rear sprocket teeth. Each of the plurality of rear sprocket teeth protrudes radially outwardly from the rear sprocket body. Tooth bottom portions are each formed between a pair of the rear sprocket teeth adjacent to each other in a circumferential direction in the plurality of rear sprocket teeth. In this example, each of the tooth bottom portions is formed in the same shape on the entire periphery.

With the plurality of rear sprockets according to the conventional technique, during a gear shifting operation, the chain is moved from one of two axially adjacent rear sprockets to the other rear sprocket. In this case, a chain roller of the chain is moved from a tooth bottom portion of the one of the rear sprockets to a tooth bottom portion of the other rear sprocket.

With the plurality of rear sprockets according to the conventional technique, however, the tooth bottom portions of the rear sprockets between which the chain roller can move are substantially limited, because the tooth bottom portions are formed in the same shape on the entire periphery.

In other words, the chain roller can not easily move between two rear sprockets in tooth bottom portions excluding the tooth bottom portions of the rear sprockets between which the chain roller can move. For example, when the chain roller move from one rear sprocket to the other rear sprocket with the tooth bottom portions between which the chain roller can not easily move, the chain roller comes into contact with a rear sprocket tooth tip of the other rear sprocket before contacting to a tooth bottom portion of the other rear sprocket. As a result, the chain roller can not move smoothly from the tooth bottom portion of one rear sprocket to the tooth bottom portion of the other rear sprocket. For this reason, with the conventional sprocket, position to which the gear shifting operation can be executed is limited.

The present invention has been made in view of the problem described above, and it is an object of the present invention to provide a bicycle sprocket that can improve the gear shifting performance.

SUMMARY

A bicycle sprocket according to one aspect of the present invention is a sprocket having a rotational center axis. The bicycle sprocket includes a sprocket body and a plurality of sprocket teeth. The sprocket teeth extend outwardly in a radial direction with respect to the rotational center axis from the sprocket body.

The sprocket teeth include a plurality of tooth tip portions and a plurality of tooth bottom portions. Each of the tooth bottom portions is located between a pair of tooth tip portions adjacent to each other in a circumferential direction with respect to the rotational center axis. The tooth bottom portions include at least one first tooth bottom portion and at least one second tooth bottom portion. The at least one first tooth bottom portion has a first tooth bottom shape. The at least one second tooth bottom portion has a second tooth bottom shape. The first tooth bottom shape is different from the second tooth bottom shape.

In the bicycle sprocket, the first tooth bottom shape of the at least one first tooth bottom portion is different from the second tooth bottom shape of the at least one second tooth bottom portion in the plurality of tooth bottom portions.

As described above, by forming the first tooth bottom shape of the first tooth bottom portion and the second tooth bottom shape of the second tooth bottom portion so as to have different shapes, the position of a chain roller (see a solid line shown in FIG. 4) on the second tooth bottom portion can be intentionally displaced with respect to the position of the chain roller (see a broken line shown in FIG. 4) located on the first tooth bottom portion. The position of the chain roller that is disposed at least one of the first tooth bottom portion and the second tooth bottom portion can be changed in the circumferential direction and/or the radial direction with respect to the rotational center axis, by displacing the position of the chain roller on the second tooth bottom portion with respect to the position of the chain roller located on the first tooth bottom portion. As a result of the position of the chain roller being changed, during a gear shifting operation, the chain roller can be easily disposed on the tooth bottom portion of an adjacent sprocket without causing the chain roller to be in contact with the sprocket teeth of the adjacent sprocket. That is, it is possible to increase the number of positions to which the chain can be shifted in the sprocket as compared to the conventional technique. Thus, the gear shifting performance of the sprocket can be improved.

In a bicycle sprocket according to another aspect of the present invention, it is preferable that the second tooth bottom shape is formed such that a tooth bottom diameter on an upstream side with respect to a drive rotation direction of the sprocket is smaller than a tooth bottom diameter on a downstream side with respect to the drive rotation direction of the sprocket. In this case, it is possible to intentionally displace the position of the chain roller on the second tooth bottom portion with respect to the position of the chain roller located on the first tooth bottom portion without compromising the driving performance of the sprocket.

In the bicycle sprocket according to another aspect of the present invention, it is preferable that the at least one second tooth bottom portion includes a linear portion. In this case, the amount of displacement of the position of the chain roller on the second tooth bottom portion can be easily adjusted with respect to the position of the chain roller located on the first tooth bottom portion.

In the bicycle sprocket according to another aspect of the present invention, it is preferable that the first tooth bottom shape is symmetric with respect to a tooth bottom center line extending in the radial direction. In this case, the first tooth bottom portion can be formed with ease.

In the bicycle sprocket according to another aspect of the present invention, it is preferable that the second tooth bottom shape is asymmetric with respect to a tooth bottom center line extending in the radial direction. In this case, the position of the chain roller disposed on the second tooth bottom portion can be suitably adjusted, and the amount of displacement of the position of the chain roller on the second tooth bottom portion can be easily adjusted with respect to the position of the chain roller located on the first tooth bottom portion.

In the bicycle sprocket according to another aspect of the present invention, it is preferable that the at least one first tooth bottom portion includes a plurality of first tooth bottom portions. In this case, with a combination with the second tooth bottom shape, the position of the chain roller on the second tooth bottom portion can be effectively displaced with respect to the position of the chain roller located on the first tooth bottom portion.

In the bicycle sprocket according to another aspect of the present invention, at least two of the first tooth bottom portions are disposed side by side in the circumferential direction with respect to the rotational center axis. In this case, with a combination with the second tooth bottom shape, the position of the chain roller on the second tooth bottom portion can be effectively displaced with respect to the position of the chain roller located on the first tooth bottom portion.

In the bicycle sprocket according to another aspect of the present invention, it is preferable that the at least one second tooth bottom portion includes a plurality of second tooth bottom portions. In this case, the roller pitch of the bicycle chain and the tooth pitch of the bicycle sprocket can be effectively displaced.

In the bicycle sprocket according to another aspect of the present invention, at least two of the second tooth bottom portions are disposed side by side in the circumferential direction with respect to the rotational center axis. In this case, the position of the chain roller on the second tooth bottom portion can be effectively displaced with respect to the position of the chain roller located on the first tooth bottom portion.

In the bicycle sprocket according to another aspect of the present invention, it is preferable that the total number of the first tooth bottom portions and the total number of the second tooth bottom portions are different from each other. In this case, the position of the chain roller on the second tooth bottom portion can be effectively displaced with respect to the position of the chain roller located on the first tooth bottom portion.

In the bicycle sprocket according to another aspect of the present invention, it is preferable that the total number of the first tooth bottom portions is greater than the total number of the second tooth bottom portions. In this case, the position of the chain roller on the second tooth bottom portion can be effectively displaced with respect to the position of the chain roller located on the first tooth bottom portion.

It is preferable that the bicycle sprocket according to another aspect of the present invention further includes an upward gear shift region. The upward gear shift region is a region that is formed intentionally so as to facilitate displacement of the bicycle chain from a small sprocket toward the bicycle sprocket. The small sprocket has less teeth than the bicycle sprocket and is adjacent to the bicycle sprocket in an axial direction that is parallel to the rotational center axis.

In this case, the number of upward gear shift regions can be increased as the number of positions to which the chain can be shifted increases. Also, the upward gear shift region can be set so as to cause the bicycle chain to be more smoothly displaced from the adjacent small sprocket toward the bicycle sprocket.

In the bicycle sprocket according to another aspect of the present invention, it is preferable that the upward gear shift region includes a plurality of upward gear shift regions. In this case, the gear shifting performance during an upward gear shifting operation can be improved.

In the bicycle sprocket according to another aspect of the present invention, it is preferable that at least one of the upward gear shift regions is provided in a vicinity of the second tooth bottom portions. In this case, the second tooth bottom shape of the second tooth bottom portion causes the chain roller to be suitably disposed on the second tooth bottom portion, and thus the upward gear shifting performance of the upward gear shift region in the vicinity of the second tooth bottom portion can be improved.

It is preferable that the bicycle sprocket according to another aspect of the present invention further comprises a downward gear shift region. The downward gear shift region is a region that is formed intentionally so as to facilitate displacement of the bicycle chain from the bicycle sprocket toward a small sprocket having less teeth than the bicycle sprocket. The small sprocket is adjacent to the bicycle sprocket in an axial direction that is parallel to the rotational center axis.

In this case, the number of downward gear shift regions can be increased as the number of positions to which the chain can be shifted increases. Also, the downward gear shift region can be set so as to cause the bicycle chain to be more smoothly displaced from the bicycle sprocket toward the adjacent small sprocket.

In the bicycle sprocket according to another aspect of the present invention, it is preferable that the downward gear shift region includes a plurality of downward gear shift regions. In this case, the gear shifting performance during a downward gear shifting operation can be improved.

In the bicycle sprocket according to another aspect of the present invention, it is preferable that at least one of the downward gear shift regions is provided in a vicinity of the second tooth bottom portions. In this case, the second tooth bottom shape of the second tooth bottom portion causes the chain roller to be suitably disposed on the second tooth bottom portion, and thus the downward gear shifting performance of the downward gear shift region in the vicinity of the second tooth bottom portion can be improved.

In the bicycle sprocket according to another aspect of the present invention, it is preferable that the second tooth bottom portions are disposed sequentially in the circumferential direction. In this case, the position of the chain roller on the second tooth bottom portion can be effectively displaced with respect to the position of the chain roller located on the first tooth bottom portion.

In the bicycle sprocket according to another aspect of the present invention, it is preferable that the tooth bottom portions include at least one third tooth bottom portion. The at least one third tooth bottom portion has a third tooth bottom shape. In this case, the third tooth bottom portion having the third tooth bottom shape can cause the position of the chain roller on the third tooth bottom portion to be effectively displaced with respect to the position of the chain roller located on the first tooth bottom portion.

In the bicycle sprocket according to another aspect of the present invention, it is preferable that a total number of the sprocket teeth is equal to or less than twenty. In general, in a sprocket in which the total number of the sprocket teeth is equal to or less than 20, the number of positions to which the chain can be shifted is limited. However, in the sprocket according to the present invention, the number of positions to which the chain can be shifted can be increased, and thus the gear shifting performance can be improved.

In the bicycle sprocket according to another aspect of the present invention, it is preferable that the total number of the sprocket teeth is equal to or less than 15. In general, in a sprocket in which the total number of the sprocket teeth is equal to or less than fifteen, the number of positions to which the chain can be shifted is further limited. However, in the sprocket according to the present invention, the number of the positions to which the chain can be shifted can be increased, and thus the gear shifting performance can be improved.

A bicycle sprocket assembly according to one aspect of the present invention includes any one of the above bicycle sprocket and further comprises an additional sprocket disposed adjacent the bicycle sprocket in an axial direction that is parallel to the rotational center axis. In this case, it is possible to provide a bicycle sprocket assembly having an excellent gear shifting performance.

In a bicycle sprocket assembly according to another aspect of the present invention, it is preferable that the bicycle sprocket is a rear sprocket. In this case, the gear shifting performance of the rear sprocket can be improved.

In the bicycle sprocket assembly according to another aspect of the present invention, it is preferable that the bicycle sprocket is a front sprocket. In this case, the gear shifting performance of the front sprocket can be improved.

According to the present invention, it is possible to provide a bicycle sprocket and a bicycle sprocket assembly that can improve the gear shifting performance.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
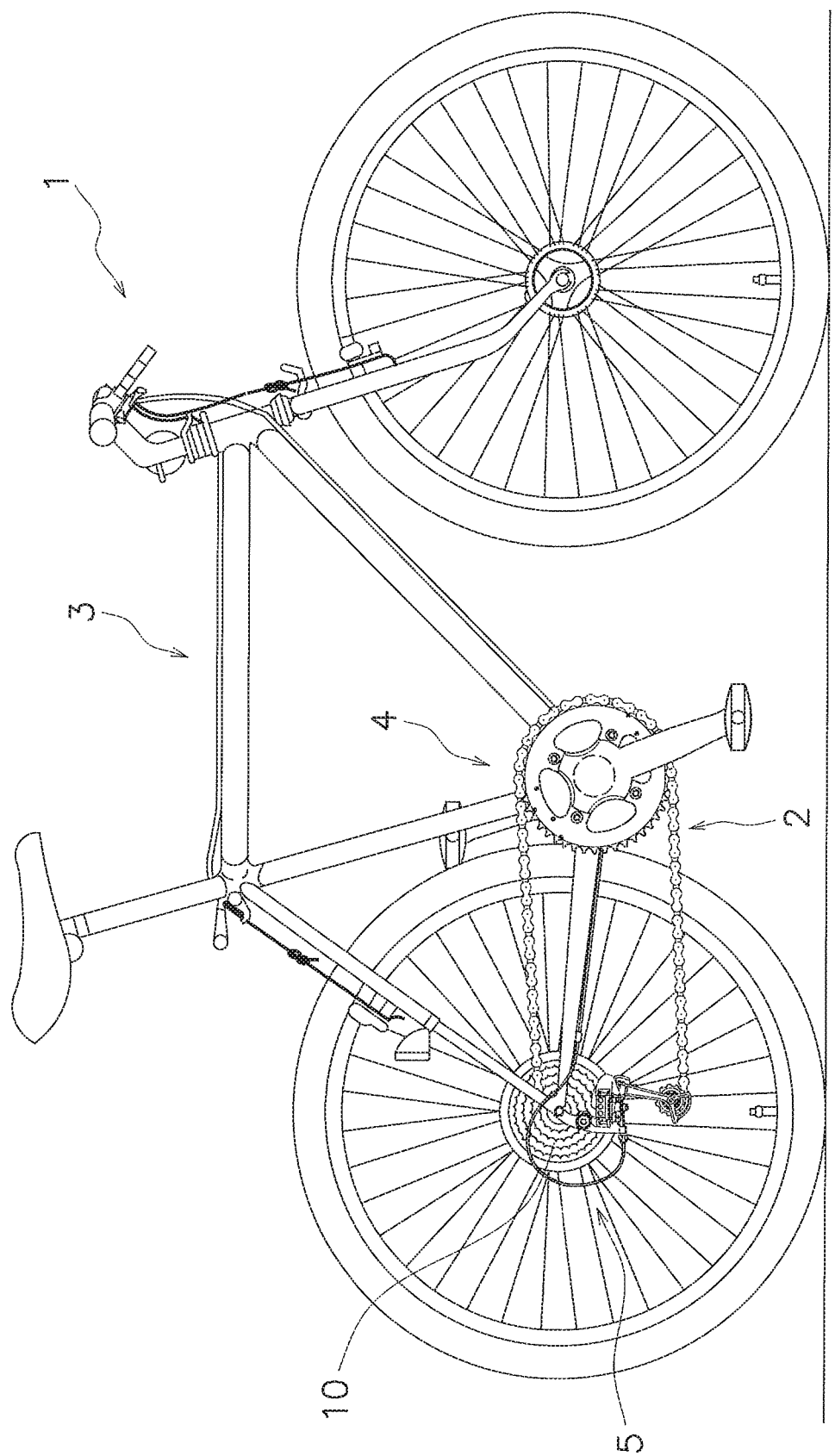
FIG. 1 is a side elevational view of a bicycle equipped with a bicycle sprocket assembly in accordance with a first embodiment.

As shown in FIG. 1, a bicycle 1 is illustrated that includes a front sprocket assembly 4 and a rear sprocket assembly 5 (an example of a bicycle sprocket assembly). The front sprocket assembly 4, the rear sprocket assembly 5 and a chain 2 together constitute a driving portion of the bicycle 1. The chain 2 is spanned between the front sprocket assembly 4 and the rear sprocket assembly 5.

A driving force is transmitted from the front sprocket assembly 4 to the rear sprocket assembly 5 via the chain 2. The rear sprocket assembly 5 is attached to a rear hub (not shown) which is rotatable relative to a frame 3, so as to integrally rotate with the rear hub. The rear sprocket assembly 5 includes a plurality of rear sprockets 10 and a plurality of spacers (not shown).

The rear sprockets 10 are preferably made of a metal. In this example, each of the rear sprockets 10 is a metallic plate-like member. The spacers are provided between two axially adjacent ones of the rear sprockets 10 of the rear sprocket assembly 5.

Hereinafter, a configuration in accordance with a first embodiment will be described with reference to two rear sprockets 11 and 12 shown in FIG. 2. The rear sprockets 11 and 12 constitute a rear sprocket assembly. The rear sprocket 11 is formed so as to have a larger diameter than the rear sprocket 12. Hereinafter, the rear sprocket 11 will be referred to as a large-diameter rear sprocket 11, and the rear sprocket 12 will be referred to as a small-diameter rear sprocket 12.

Large-Diameter Rear Sprocket

The large-diameter rear sprocket 11 (an example of a bicycle sprocket) is disposed axially adjacent to the small-diameter rear sprocket 12. As shown in FIGS. 2 and 3, the large-diameter rear sprocket 11 has a rotational center axis X. As used herein, the terms "axially" and "axial direction" refer to a direction parallel to the rotational center axis X.

As shown in FIG. 3, the large-diameter rear sprocket 11 includes a first sprocket body 13 (an example of a sprocket body), a plurality of first sprocket teeth 14 (an example of a plurality of sprocket teeth), an upward gear shift region 15 and a plurality of downward gear shift regions 16.

The first sprocket body 13 is formed in a substantially annular shape. The first sprocket body 13 is configured to rotate around a hub axle (not shown). The hub axle is mounted to the frame 3, and the rear hub (not shown) is rotatably attached to the hub axle.

The first sprocket body 13 is attached to the rear huh which is rotatable relative to the hub axle, so as to integrally rotate with the rear hub. This configuration allows the first sprocket to rotate together with the rear hub relative to the hub axle, or in other words, relative to the frame 3.

The first sprocket teeth 14 are configured such that the chain 2 can be engaged therewith. The first sprocket teeth 14 are integrally provided on the first sprocket body 13. Specifically, the first sprocket teeth 14 are disposed on an outer circumferential portion of the first sprocket body 13 at intervals in a circumferential direction with respect to the rotational center axis X. Also, each of the first sprocket teeth 14 extends outwardly from the first sprocket body 13 in a radial direction with respect to the rotational center axis X.

For example, the total number of the first sprocket teeth 14 is equal to or less than twenty. Specifically, the total number of the first sprocket teeth 14 is equal to or less than fifteen. In this example, an example will be described in which the total number of the first sprocket teeth 14 is thirteen.

Figure 2:
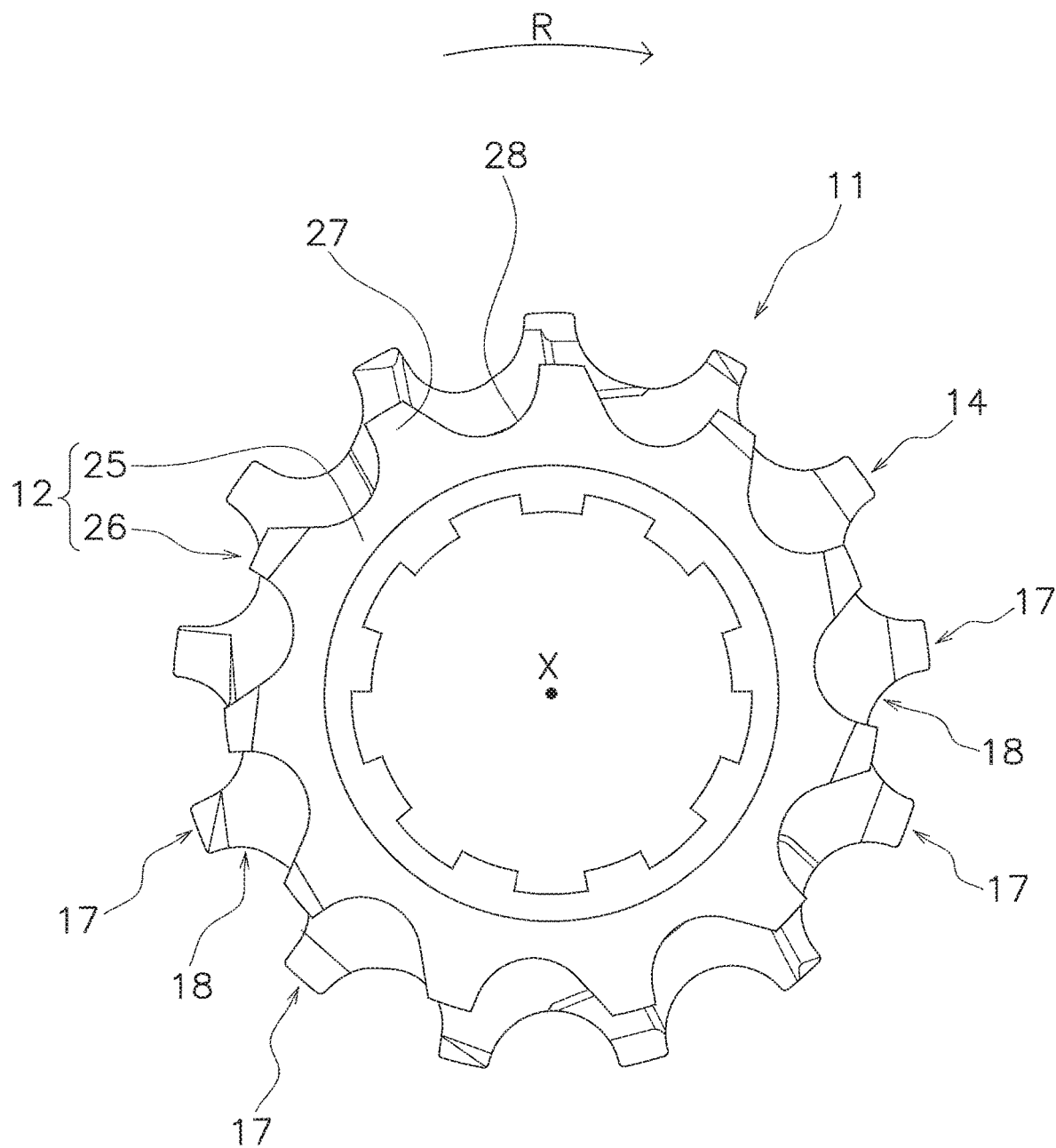
FIG. 2 is a side elevational view of two rear sprockets out of a plurality of rear sprockets of the bicycle sprocket assembly illustrated in FIG. 1.
Figure 3:
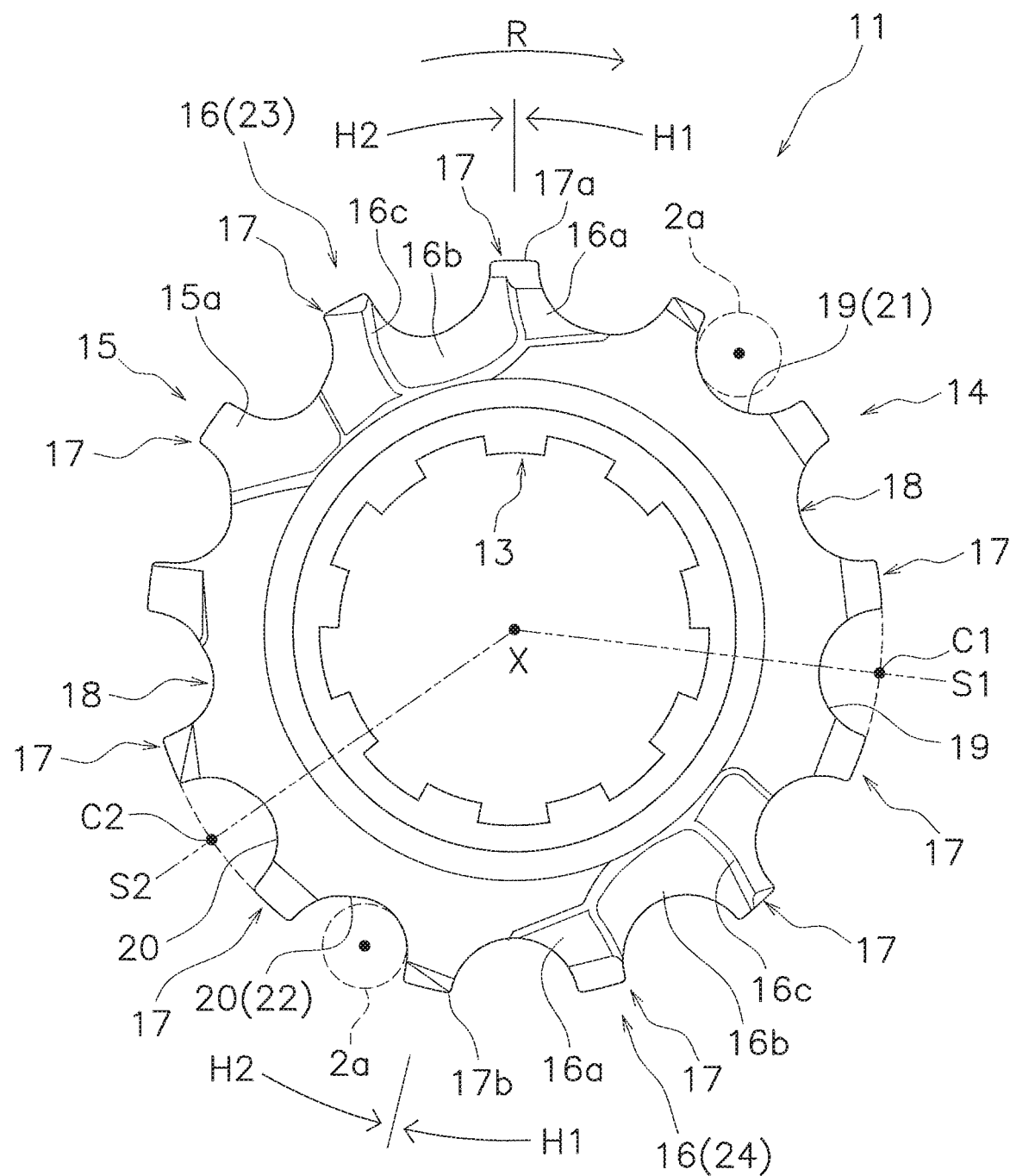
FIG. 3 is a side elevational view of a large-diameter rear sprocket of the bicycle sprocket assembly illustrated in FIG. 1.

As shown in FIGS. 2 and 3, the first sprocket teeth 14 include a plurality of (for example thirteen) tooth tip portions 17 and a plurality of (for example thirteen) tooth bottom portions 18.

Each of the tooth bottom portions 18 is provided between a pair of tooth tip portions 17 that are adjacent to each other in the circumferential direction with respect to the rotational center axis X. In other words, each of the tooth bottom portions 18 is located between a pair of the tooth tip portions 17 that are adjacent to each other in the circumferential direction with respect to the rotational center axis X.

As shown in FIG. 3, the tooth bottom portions 18 include a plurality of (for example six) first tooth bottom portions 19 and a plurality of (for example seven) second tooth bottom portions 20. The total number of the first tooth bottom portions 19 and the total number of the second tooth bottom portions 20 are different from each other. Specifically, the total number of the first tooth bottom portions 19 is greater than total number of the second tooth bottom portions 20. The first tooth bottom portions 19 are examples of at least one first tooth bottom portion. The second tooth bottom portions 20 are examples of at least one second tooth bottom portion.

As shown in FIG. 3, the first tooth bottom portions 19 are disposed sequentially in the circumferential direction. Also, at least two of the first tooth bottom portions 19 are disposed side by side in the circumferential direction. Specifically, in a first tooth bottom forming range H1, the first tooth bottom portions 19 are sequentially formed on the outer circumferential portion of the first sprocket body 13.

The first tooth bottom forming range H1 is defined by two boundary tooth tip portions (a first boundary tooth tip portion 17a and a second boundary tooth tip portion 7b) that are disposed between the first tooth bottom portions 19 and the second tooth bottom portions 20 in the circumferential direction. Specifically, the first tooth bottom forming range H1 is defined by a straight line connecting a top center of the first boundary tooth tip portion 17a and the rotational center axis X and a straight line connecting a top center of the second boundary tooth tip portion 17b and the rotational center axis X. The top center of the first boundary tooth tip portion 17a and the top center of the second boundary tooth tip portion 17b are the centers of the tooth tip portions 17a and 17b in the circumferential direction. The first tooth bottom forming range H1 includes the first tooth bottom portions 19.

Each of the first tooth bottom portions 19 is configured so as to be capable of receiving a chain roller 2a. Each of the first tooth bottom portions 19 has a first tooth bottom shape. The first tooth bottom shape is symmetric with respect to a first tooth bottom center line S1 that extends in the radial direction. The first tooth bottom center line S1 is a straight line connecting the rotational center axis X and a center C1 of distance between tooth tips of a pair of circumferentially adjacent ones of the tooth tip portions 17. In this example, the first tooth bottom shape is formed in a substantially arc shape.

In this example, the first tooth bottom portions 19 each include a first gear shift tooth bottom portion 21. The first gear shift tooth bottom portion 21 is a tooth bottom portion that triggers the chain roller 2a to move from the large-diameter rear sprocket 11 to the small-diameter rear sprocket 12. The first gear shift tooth bottom portions 21 are provided on a downstream side of a first downward gear shift region 23 (described below) in a sprocket drive rotation direction R.

As shown in FIG. 3, the second tooth bottom portions 20 are disposed sequentially in the circumferential direction. Also, at least two of the second tooth bottom portions 20 are disposed side by side in the circumferential direction. Specifically, in a second tooth bottom forming range H2, the second tooth bottom portions 20 are formed sequentially on the outer circumferential portion of the first sprocket body 13.

The second tooth bottom forming range H2 is defined by the first boundary tooth tip portion 17a and the second boundary tooth tip portion 17b, as with the first tooth bottom forming range H1 described above. The second tooth bottom forming range H2 includes the second tooth bottom portions 20.

Each of the second tooth bottom portions 20 is configured so as to be capable of receiving the chain roller 2a. Each second tooth bottom portion 20 has a second tooth bottom shape. The first tooth bottom shape described above is formed in a shape different from the second tooth bottom shape. For example, the second tooth bottom shape is asymmetric with respect to a second tooth bottom center line S2 that extends in the radial direction. The second tooth bottom center line S2 is a straight line connecting the rotational center axis X and a center C2 of distance between tooth tips of a pair of circumferentially adjacent ones of the tooth tip portions 17.

Figure 4:
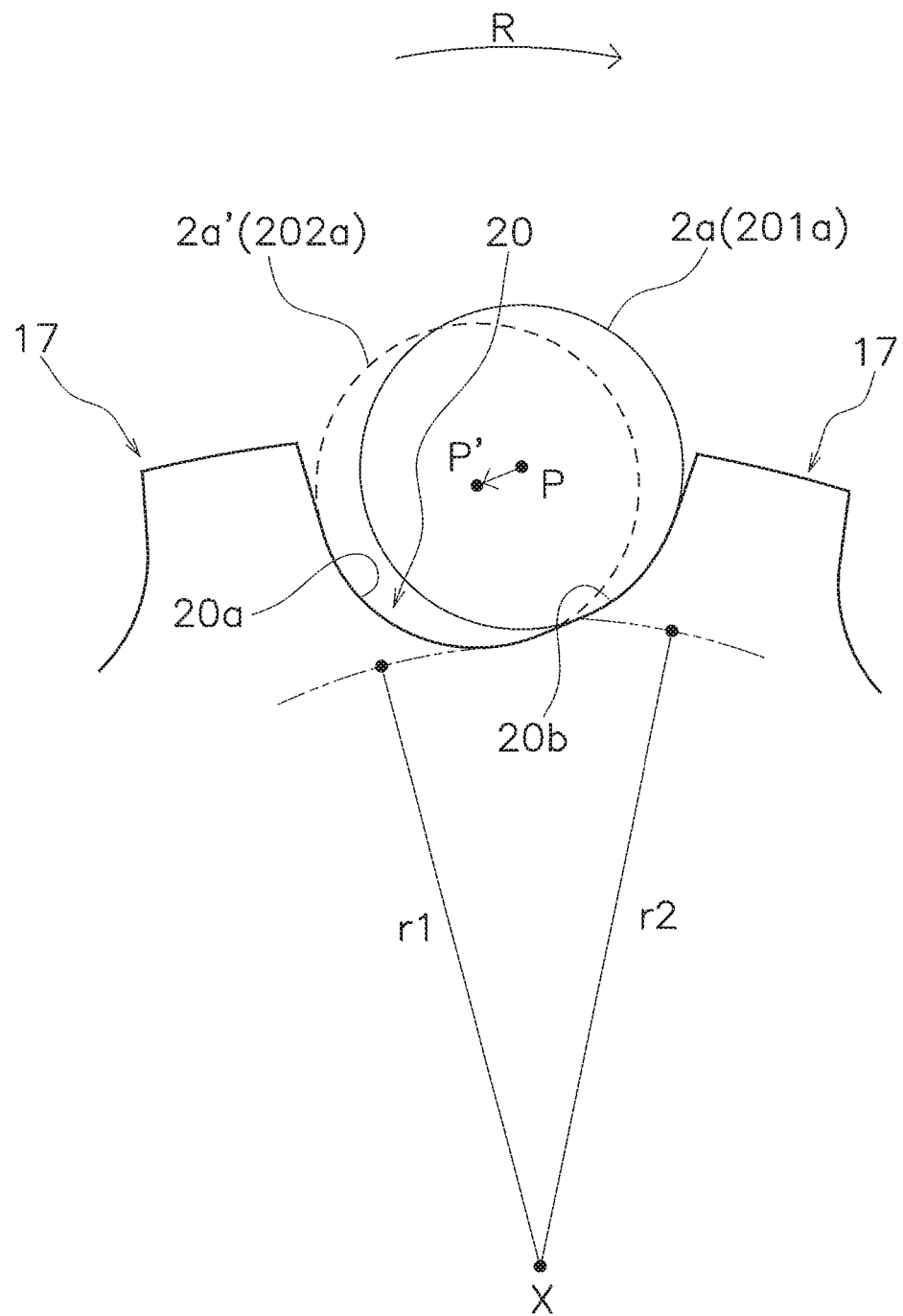
FIG. 4 is an enlarged side elevational view of sprocket teeth of the diameter rear sprocket illustrated in FIG. 3.

Also, as shown in FIG. 4, the second tooth bottom shape is formed such that a tooth bottom diameter r1 on an upstream side of the sprocket drive rotation direction R is smaller than a tooth bottom diameter r2 on a downstream side of the sprocket drive rotation direction R. The second tooth bottom shape is formed by sequentially connecting substantially two arcs.

For example, the second tooth bottom shape is composed of a first arc portion 20a and a second arc portion 20b. The first arc portion 20a forms a second tooth bottom portion 20 on the upstream side of the sprocket drive rotation direction R. The tooth bottom diameter of the first arc portion 20a is the diameter "r1" described above. The tooth bottom diameter r1 of the first arc portion 20a corresponds to the length of a line segment connecting the rotational center axis X and a point that is closest to the rotational center axis X in the arc of the first arc portion 20a.

The second arc portion 20b forms the second tooth bottom portion 20 on the downstream side of the sprocket drive rotation direction R. The tooth bottom diameter of the second arc portion 20b is the diameter "r2" described above. The tooth bottom diameter r2 of the second arc portion 20b corresponds to the length of a line segment connecting the rotational center axis X and a point that is closest to the rotational center axis X in the arc of the second arc portion 20b. The tooth bottom diameter r2 of the second arc portion 20b is greater than tooth bottom diameter r1 of the first arc portion 20a.

In this example, as shown in FIG. 3, each of the second tooth bottom portions 20 includes a second gear shift tooth bottom portion 22. The second gear shift tooth bottom portion 22 is a tooth bottom portion that triggers the chain roller 2a to move from the large-diameter rear sprocket 11 to the small-diameter rear sprocket 12. The second gear shift tooth bottom portion 22 is provided on a downstream side of a second downward gear shift region 24 (described later) in the sprocket drive rotation direction R.

The upward gear shift region 15 is a region that is formed intentionally so as to facilitate displacement of the chain 2 from the small-diameter rear sprocket 12, which is adjacent to the large-diameter rear sprocket 11, toward the large-diameter rear sprocket 11 in an axial direction that is parallel to the rotational center axis X.

As shown in FIG. 3, the upward gear shift region 15 is provided in the vicinity of the second tooth bottom portions 20. For example, the upward gear shift region 15 is provided in the large-diameter rear sprocket 11 so as to be included in the second tooth bottom forming range H2.

The upward gear shift region 15 includes a first recess portion 15a. During a gear shifting operation, an outer link of the chain 2 is disposed in the first recess portion 15a and guides the chain 2 toward the large-diameter rear sprocket 11.

The first recess portion 15a is formed on a side surface of any one of the plurality of first sprocket teeth 14. The position where the first recess portion 15a is formed is not limited to the side surface of the first sprocket teeth 14, and the first recess portion 15a can be formed on a side surface of the first sprocket body 13.

The first recess portion 15a is formed in a recessed shape on the side surface of the first sprocket tooth 14. A bottom portion of the first recess portion 15a is configured to receive the outer link of the chain 2. The side surface mentioned above is a surface facing the small-diameter rear sprocket 12 in the axial direction.

With this configuration, if an upward gear shifting operation is performed in a state where the chain 2 is engaged with the small-diameter rear sprocket 12, the outer link of the chain 2 comes into proximity to the first recess portion 15a. In this state, if the large-diameter rear sprocket 11 and the small-diameter rear sprocket 12 are rotated, the chain 2 is detached from the small-diameter rear sprocket 12 and engaged with the first sprocket teeth 14 of the large-diameter rear sprocket 11. In this way, in the upward gear shift region 15, the chain 2 is shifted from the small-diameter rear sprocket 12 to the large-diameter rear sprocket 11.

The downward gear shift regions 16 are regions that are formed intentionally so as to facilitate displacement of the bicycle chain 2 from the large-diameter rear sprocket 11 toward the small-diameter rear sprocket 12, which is adjacent to the large-diameter rear sprocket 11 in the axial direction that is parallel to the rotational center axis X.

As shown in FIG. 3, at least one of the downward gear shift regions 16 is provided in the vicinity of the second tooth bottom portions 20. In this example, the downward gear shift regions 16 includes two downward gear shift regions that are provided on the large-diameter rear sprocket 11 in the vicinity of the second tooth bottom forming range H2.

For example, the downward gear shift regions 16 include a first downward gear shift region 23 and a second downward gear shift region 24. The first downward gear shift region 23 is formed so as to extend across the first tooth bottom forming range H1 and the second tooth bottom forming range H2. The second downward gear shift region 24 is formed in the first tooth bottom forming range H1.

Each of the downward gear shift regions 16 (the first downward gear shift region 23 and the second downward gear shift region 24) includes a second recess portion 16a and a third recess portion 16b.

During a gear shifting operation, an inner link of the chain 2 is disposed in the second recess portion 16a and guides the chain 2 toward the small-diameter rear sprocket 12.

The second recess portion 16a is disposed adjacent to the third recess portion 16b in the circumferential direction. Specifically, the second recess portion 16a is disposed adjacent to the third recess portion 16b on the downstream side of the third recess portion 16b in the sprocket drive rotation direction R.

The second recess portion 16a is formed on a side surface of the large-diameter rear sprocket 11. Specifically, the second recess portion 16a is formed on a side surface of a first sprocket tooth 14 (for example, the tooth tip portion 17). The position where the second recess portion 16a is formed is not limited to the side surface of a first sprocket tooth 14, and the second recess portion 16a can be formed on the side surface of the first sprocket body 13.

The second recess portion 16a is formed in a recessed shape on the side surface of the large-diameter rear sprocket 11. A bottom portion of the second recess portion 16a is configured to receive the inner link of the chain 2. The side surface mentioned above is a surface facing the small-diameter rear sprocket 12 in the axial direction.

During a gear shifting operation, the outer link of the chain 2 is disposed in the third recess portion 16b and guides the chain 2 toward the small-diameter sprocket.

The third recess portion 16b is disposed adjacent to the second recess portion 16a in the circumferential direction. Specifically, the third recess portion 16b is disposed adjacent to the second recess portion 16a on the upstream side of the second recess portion 16a in the sprocket drive rotation direction R.

The third recess portion 16b is formed on the side surface of the large-diameter rear sprocket 11. Specifically, the third recess portion 16b is formed on the side surface of the large-diameter rear sprocket 11 at a position between a pair of first sprocket teeth 14 (for example, a pair of the tooth tip portions 17) that are adjacent in the circumferential direction.

The second recess portion 16a described above is formed on one of the pair of the first sprocket teeth 14 (for example, the pair of tooth tip portions 17). The position where the third recess portion 16b is formed is not limited to the side surface of the first sprocket teeth 14, and the third recess portion 16b can be formed on a side surface of the first sprocket body 13.

The third recess portion 16b is formed in a recessed shape on the side surface of the large-diameter rear sprocket 11. A bottom portion of the third recess portion 16b is configured to receive the outer link of the chain 2. The side surface mentioned above is a surface facing the small-diameter rear sprocket 12 in the axial direction.

In this example, the third recess portion 16b has a depth that is deeper than the second recess portion 16a. In this example, there is a step between the bottom portion of the third recess portion 16b and the bottom portion of the second recess portion 16a. In the bottom portion of the third recess portion 16b, the outer link of the chain 2 is disposed. As described above, in the bottom portion of the second recess portion 16a, the inner link of the chain 2 is disposed.

With this configuration, if a downward gear shifting operation is performed in a state where the chain 2 is engaged with the large-diameter rear sprocket 11, the inner link faces the second recess portion 16a between the large-diameter rear sprocket 11 and the small-diameter rear sprocket 12. Also, at this time, the outer link faces the third recess portion 16b between the large-diameter rear sprocket 11 and the small-diameter rear sprocket 12.

In this state, if the large-diameter rear sprocket 11 and the small-diameter sprocket 12 are rotated, the outer link of the chain 2 is pressed toward the small-diameter rear sprocket 12 side by a wall portion 16c of the third recess portion 16b. Then, the chain roller 2a, which is disposed in the first gear shift tooth bottom portion 21 or the second gear shift tooth bottom portion 22, is detached from the first gear shift tooth bottom portion 21 or the second gear shift tooth bottom portion 22.

That is, the chain 2 starts to detach from the large-diameter rear sprocket 11, and is engaged with second sprocket teeth 26 of the small-diameter rear sprocket 12. In this way, the chain 2 is shifted from the large-diameter rear sprocket 11 to the small-diameter rear sprocket 12 with the first downward gear shift region 23 or the second downward gear shift region 24.

Small-Diameter Rear Sprocket

The small-diameter rear sprocket 12 is disposed adjacent to the large-diameter rear sprocket 11 in the axial direction. The small-diameter rear sprocket 12 has a rotational center axis X. The rotational center axis X of the small-diameter rear sprocket 12 is coaxial with the rotational center axis X of the large-diameter rear sprocket 11. The small-diameter rear sprocket 12 is configured so as to integrally rotate with the large-diameter rear sprocket 11. The small-diameter rear sprocket 12 shown in this example is, for example, a top gear rear sprocket.

As shown in FIG. 2, the small-diameter rear sprocket 12 includes a second sprocket body 25 and a plurality of second sprocket teeth 26.

The second sprocket body 25 is formed in a substantially annular shape. The second sprocket body 25 is configured to rotate around the hub axle (not shown). The hub axle is mounted to the frame 3, and the rear hub (not shown) is rotatably attached to the hub axle.

The second sprocket body 25 is attached to the rear hub which is rotatable relative to the hub axle so as to integrally rotate with the rear hub. This configuration allows the second sprocket to rotate together with the rear hub relative to the hub axle, or in other words, relative to the frame 3.

The second sprocket teeth 26 are configured such that the chain 2 engages therewith. The second sprocket teeth 26 are provided on the second sprocket body 25. Specifically, the second sprocket teeth 26 are disposed on an outer circumferential portion of the second sprocket body 25 at intervals in a circumferential direction with respect to the rotational center axis X. Also, each of the second sprocket teeth 26 extends outwardly from the second sprocket body 25 in a radial direction with respect to the rotational center axis X. In this example, an example will be described in which the total number of the second sprocket teeth 26 is eleven.

The second sprocket teeth 26 include a plurality of (for example eleven) tooth tip portions 27 and a plurality of (for example eleven) tooth bottom portions 28. Each of the tooth bottom portions 28 is provided between a pair of the tooth tip portions 27 that are adjacent to each other in the circumferential direction with respect to the rotational center axis X. In other words, each of the tooth bottom portions 28 is located between a pair of the tooth tip portions 27 that are adjacent to each other in the circumferential direction with respect to the rotational center axis X. Each of the tooth bottom portions 28 is formed so as to receive the chain roller 2a. In this example, the tooth bottom portions 28 are formed to have the same tooth bottom shape in the circumferential direction. That is, the tooth bottom portions 28 are formed in the same shape on the entire periphery. In this example, the tooth bottom shape is formed in a substantially arc shape.

Movement of Chain from Large-Diameter Rear Sprocket to Small-Diameter Rear Sprocket In the case where the large-diameter rear sprocket 11 and the small-diameter rear sprocket 12 are configured as described above, the chain 2 is moved from the large-diameter rear sprocket 11 to the small-diameter rear sprocket 12 in the following manner.

Figure 5:
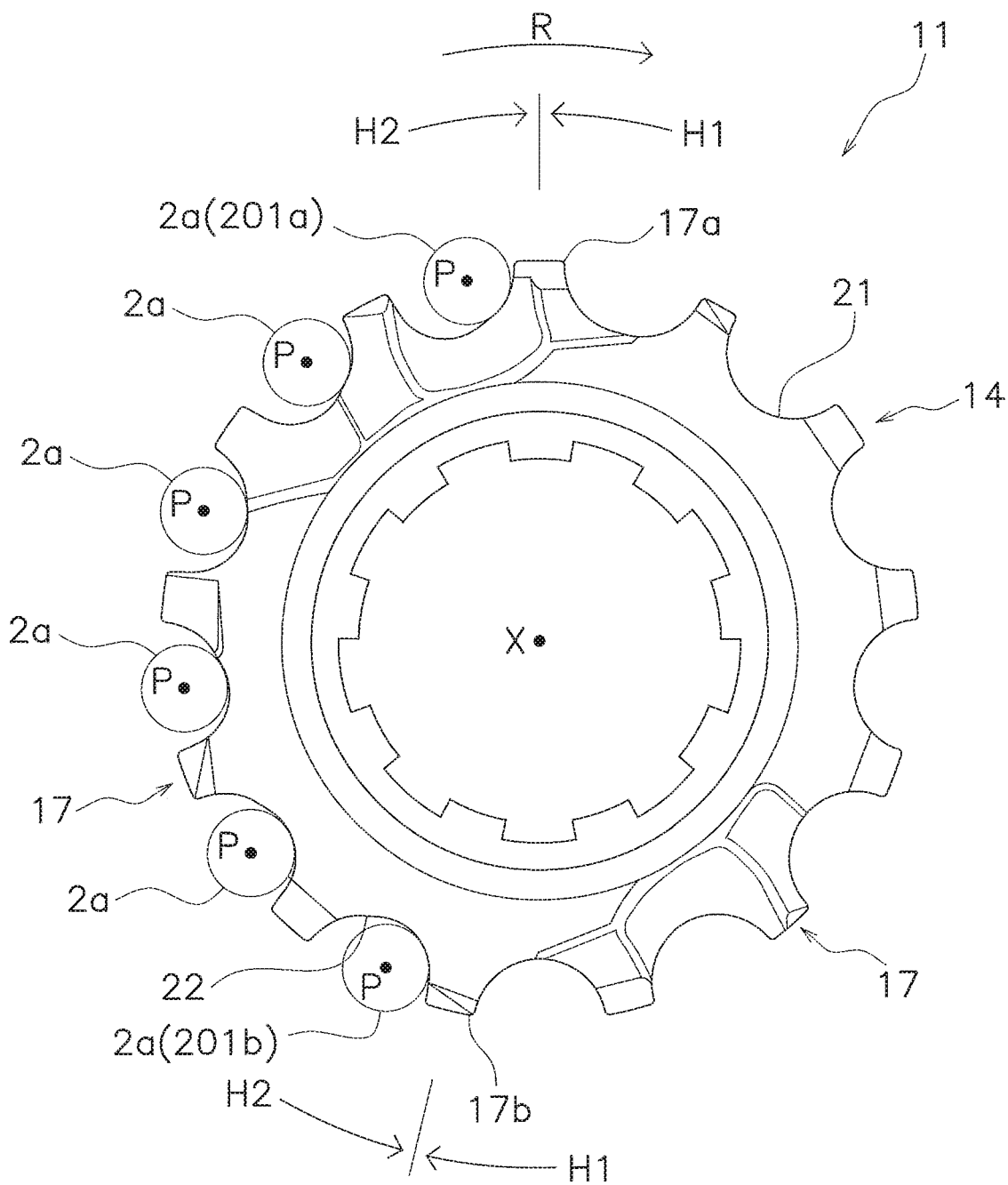
FIG. 5 is a side elevational view illustrating a positional relationship between the large-diameter rear sprocket illustrated in FIGS. 3 and 4 and a chain roller.

For example, as shown in FIG. 5, the chain 2 is engaged with the first sprocket teeth 14 of the large-diameter rear sprocket 11 between the first boundary tooth tip portion 17a and the second boundary tooth tip portion 17b (in the second tooth bottom forming range H2).

Specifically, as shown in FIGS. 4 and 5, the chain rollers 2a are disposed in the second tooth bottom portions 20 between the first boundary tooth tip portion 17a and the second boundary tooth tip portion 17b in the second tooth bottom forming range H2. In the second tooth bottom forming range H2, the position of the chain roller 2a (for example, center position P) is moved in a reverse direction of the sprocket drive rotation direction R and toward the rotational center axis X of the large-diameter rear sprocket 11 as it goes from the first boundary tooth tip portion 17a to the second boundary tooth tip portion 17b. This movement is implemented by forming the second tooth bottom shape of the second tooth bottom portions 20 to be the above-described shape. It is thereby possible to intentionally displace the position of the chain roller 2a (see a solid line shown in FIG. 4) in the second tooth bottom portion 20 with respect to the position of a chain roller 2a' (see a broken line shown in FIG. 4) located in the first tooth bottom portion 19.

The position of the chain roller 2a' indicated by the broken line shown in FIG. 4 is the position of the chain roller 2a in the case of a configuration in which the tooth bottom portions 18 of the large-diameter rear sprocket 11 consist only of the first tooth bottom portions 19.

In this example, a chain roller 201a (the chain roller 2a in the vicinity of the first boundary tooth tip portion 17a) on the most downstream side of the sprocket drive rotation direction R in the second tooth bottom forming range H2 is disposed on the second tooth bottom portion 20 at a position proximate to the first boundary tooth tip portion 17a. On the other hand, a chain roller 201b (the chain roller 2a in the vicinity of the second boundary tooth tip portion 17b) on the most upstream side of the sprocket drive rotation direction R in the second tooth bottom forming range H2 is disposed on the second tooth bottom portion 20 at a position proximate to the second boundary tooth tip portion 17b. The second tooth bottom portion 20 in which the chain roller 201b is disposed corresponds to the second gear shift tooth bottom portion 22 described above.

With the second tooth bottom portions 20 (second tooth bottom shape) in the second tooth bottom forming range H2, it is possible to increase the number of tooth bottom portions in which the chain roller 2a can move from the large-diameter rear sprocket 11 to the small-diameter rear sprocket 12, by changing the position (center position P) of the chain roller 2a in the manner as described above.

For example, in the case of a configuration in which the first sprocket teeth 14 of the large-diameter rear sprocket 11 are composed only of the first tooth bottom portions 19 (first tooth bottom shape), during a downward gear shifting operation, the chain roller 2a can move from the large-diameter rear sprocket 11 to the small-diameter rear sprocket 12 in only one location. That is, during a downward gear shifting operation, only in the first gear shift tooth bottom portion 21, the chain roller 2a can move from the large-diameter rear sprocket 11 to the small-diameter rear sprocket 12.

Figure 6:
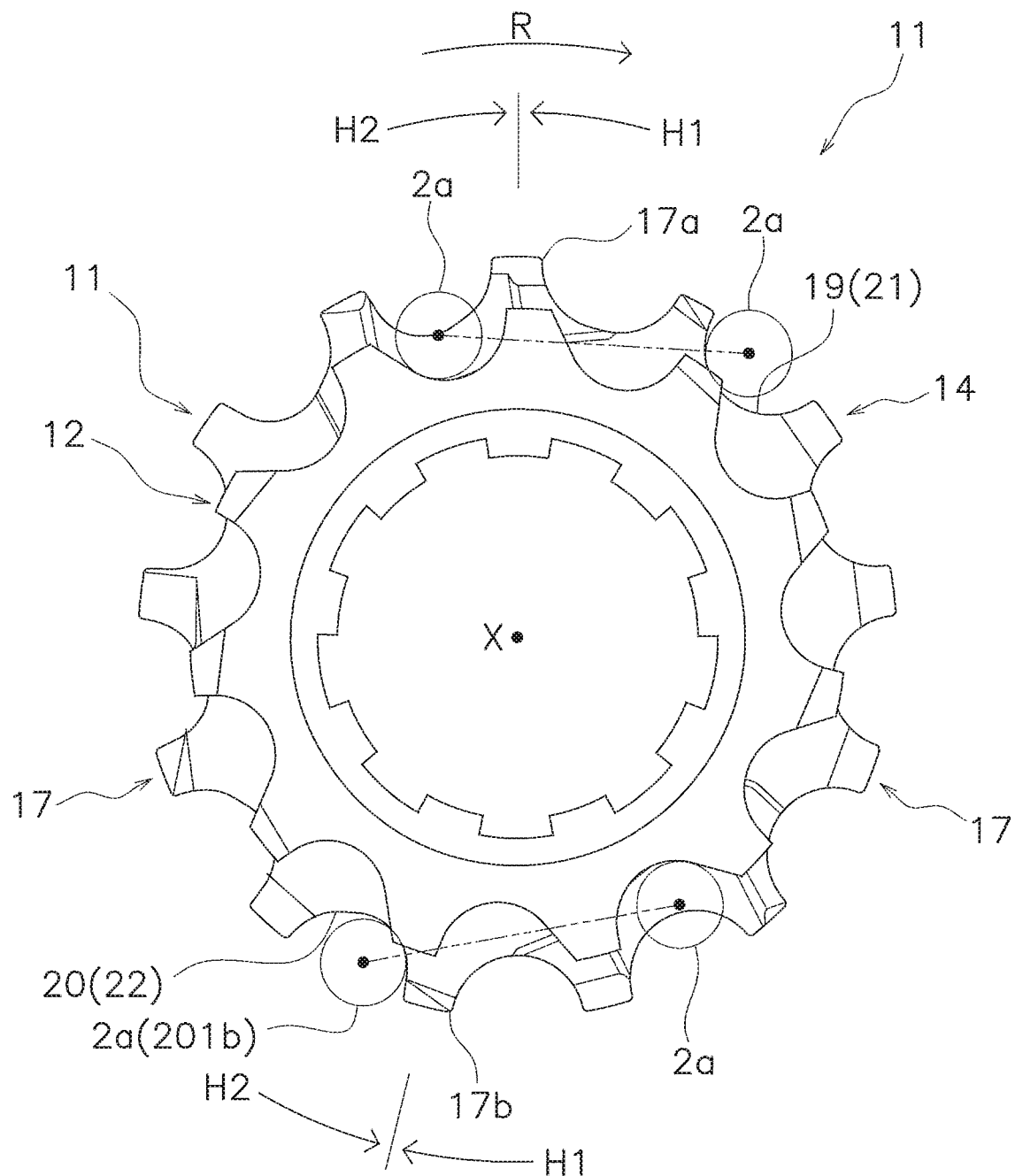
FIG. 6 is a side elevational view illustrating the movement of the chain roller from the large-diameter rear sprocket to a small-diameter rear sprocket.

On the other hand, in the present embodiment, as shown in FIG. 6, the first sprocket teeth 14 of the large-diameter rear sprocket 11 include not only the first tooth bottom portions 19 (first tooth bottom shape), but also the second tooth bottom portions 20 (second tooth bottom shape), and it is therefore possible to, during a downward gear shifting operation, move the chain roller 2a from the large-diameter rear sprocket 11 to the small-diameter rear sprocket 12 in two locations.

That is, in the present embodiment, during a downward gear shifting operation, the chain roller 2a can be suitably moved from the large-diameter rear sprocket 11 to the small-diameter rear sprocket 12 in the first gear shift tooth bottom portion 21 and the second gear shift tooth bottom portion 22. With this configuration, in the large-diameter rear sprocket 11, the gear shifting performance of the downward gear shifting operation can be improved.

Second Embodiment

Figure 7:
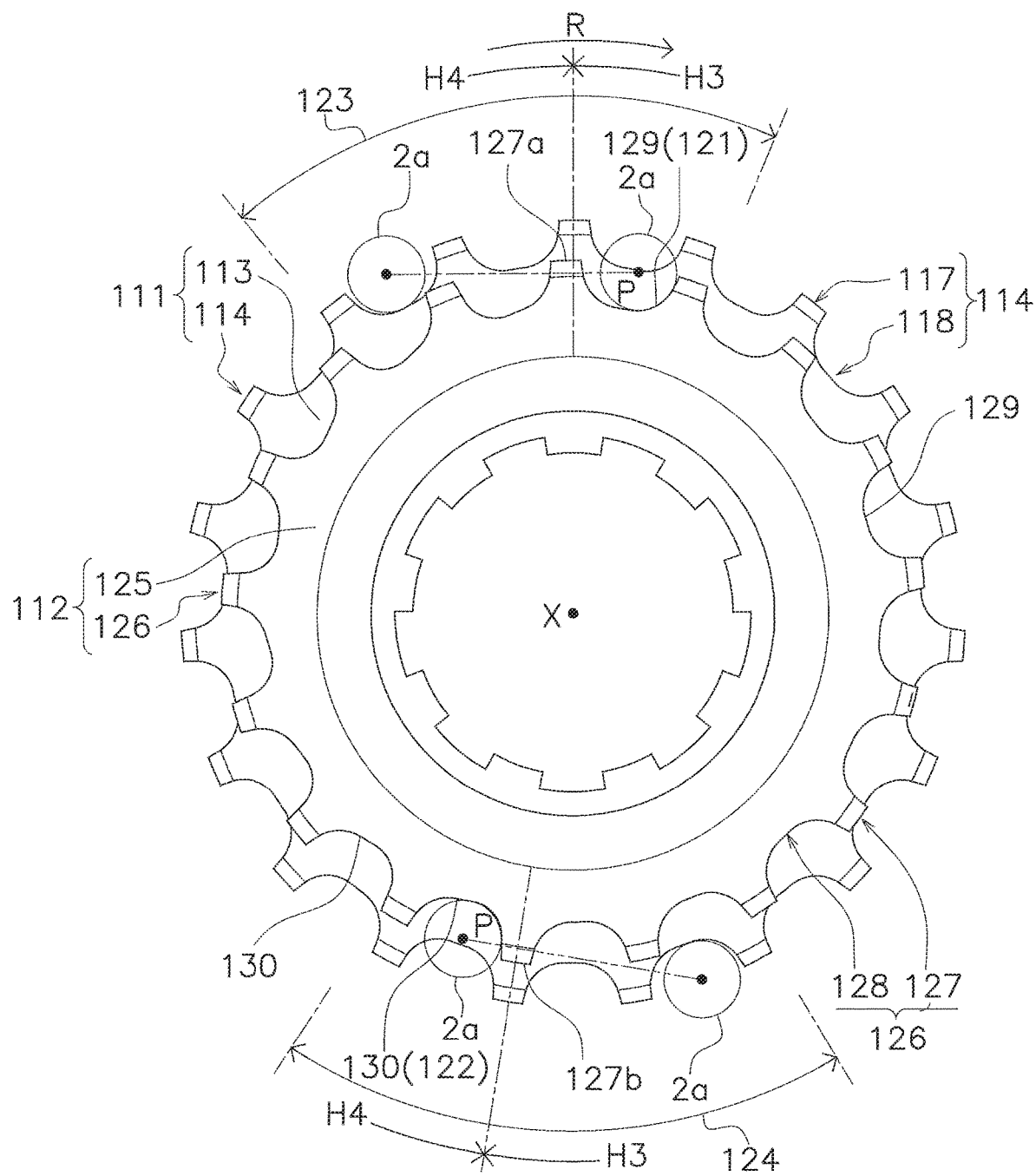
FIG. 7 is a side elevational view of two rear sprockets according to a second embodiment.

The present invention can be applied to a large-diameter rear sprocket 111 and a small-diameter rear sprocket 112 (an example of a bicycle sprocket) shown in FIG. 7, in place of the large-diameter rear sprocket 11 and the small-diameter rear sprocket 12 according to the first embodiment.

In the second embodiment, of the large-diameter rear sprocket 111 has a plurality of tooth bottom portions 118 that are formed in the same shape on the entire periphery. Also, the small-diameter rear sprocket 112 has a plurality of tooth bottom portions 128 having different shapes.

In the second embodiment, a description of constituent elements that are the same as those of the first embodiment is omitted. Also, the configuration that is substantially the same as those of the first embodiment are given the same reference numerals as those of the first embodiment.

Large-Diameter Rear Sprocket

The large-diameter rear sprocket 111 includes a third sprocket body 113 and a plurality of third sprocket teeth 114. The third sprocket body 113 is formed to have substantially the same configuration as the first sprocket body 13 according to the first embodiment except for the sprocket diameter.

The third sprocket teeth 114 include a plurality of tooth tip portions 117 and a plurality of tooth bottom portions 118. The tooth tip portions 117 are formed to have substantially the same configuration as the tooth tip portions 17 according to the first embodiment except for the total number of tooth tips. In this example, the total number of the tooth tip portions 117 is, for example, nineteen. That is, the total number of the third sprocket teeth 114 is, for example, nineteen.

The tooth bottom portions 118 are formed in the same shape on the entire periphery. For example, each of the tooth bottom shapes of the tooth bottom portions 118 is formed to be the same in the circumferential direction. That is, as with the tooth bottom shape of the small-diameter rear sprocket 12 according to the first embodiment, each of the tooth bottom shapes of the tooth bottom portions 118 is formed to be the same in the circumferential direction.

Although not illustrated here, as in the first embodiment, an upward gear shift region and a downward gear shift region can be provided in the large-diameter rear sprocket 111.

Small-Diameter Rear Sprocket

The small-diameter rear sprocket 112 includes a fourth sprocket body 125 (an example of a sprocket body) and a plurality of fourth sprocket teeth 126 (an example of a plurality of sprocket teeth).

The fourth sprocket body 125 is formed to have substantially the same configuration as the second sprocket body 25 according to the first embodiment except for the sprocket diameter.

The fourth sprocket teeth 126 include a plurality of tooth tip portions 127 and a plurality of tooth bottom portions 128. The tooth tip portions 127 are formed to have substantially the same configuration as the tooth tip portions 27 according to the first embodiment except for the total number of tooth tips. In this example, the total number of the tooth tip portions 127 is, for example, seventeen. That is, the total number of the fourth sprocket teeth 126 is, for example, seventeen.

The tooth bottom portions 128 include a plurality of (for example, nine) third tooth bottom portions 129 (an example of at least one first tooth bottom portion) and a plurality of (for example, eight) fourth tooth bottom portions 130 (an example of at least one second tooth bottom portion). As just described, the total number of the third tooth bottom portions 129 and the total number of the fourth tooth bottom portions 130 are different from each other. Specifically, the total number of the third tooth bottom portions 129 is greater than total number of the fourth tooth bottom portions 130.

In this example, each of the third tooth bottom portions 129 have a third tooth bottom shape that is formed to be symmetric, as with the first tooth bottom shape of the large-diameter rear sprocket 11 according to the first embodiment. The third tooth bottom shape of each of the third tooth bottom portions 129 includes, for example, one type of arc portion.

Each of the fourth tooth bottom portions 130 has a fourth tooth bottom shape that is formed to be different from the third tooth bottom shape of each of the third tooth bottom portions 129. The fourth tooth bottom shape of each of the fourth tooth bottom portions 130 is formed to be asymmetric, as with the second tooth bottom shape of the large-diameter rear sprocket 11 according to the first embodiment. The fourth tooth bottom shape of each of the fourth tooth bottom portions 130 includes, for example, two types of arc portions.

For this reason, a third tooth bottom forming range H3 corresponding to the first tooth bottom forming range H1 and a fourth tooth bottom forming range H4 corresponding to the second tooth bottom forming range H2 are formed in the small-diameter rear sprocket 112, as in the first embodiment. The third tooth bottom forming range H3 and the fourth tooth bottom forming range H4 are defined by a third boundary tooth tip portion 127a and a fourth boundary tooth tip portion 127b.

The nine of the third tooth bottom portions 129 are included in the third tooth bottom forming range H3. The third tooth bottom portions 129 include third gear shift tooth bottom portions 121 corresponding to the first gear shift tooth bottom portions 21. Also, the fourth tooth bottom portions 130 are included in the fourth tooth bottom forming range H4. The fourth tooth bottom portions 130 include a plurality of fourth gear shift tooth bottom portions 122 corresponding to the second gear shift tooth bottom portions 22.

Although not illustrated here, an upward gear shift region and a downward gear shift region can be provided in the small-diameter rear sprocket 112, as in the first embodiment.

Movement of Chain from Small-Diameter Rear Sprocket to Large-Diameter Rear Sprocket In the case where the large-diameter rear sprocket 111 and the small-diameter rear sprocket 112 are configured as described above, the chain 2 is moved from the small-diameter rear sprocket 112 to the large-diameter rear sprocket 111 in the following manner.

For example, the chain 2 is engaged with the fourth sprocket teeth 126 of the small-diameter rear sprocket 112 between the third boundary tooth tip portion 127a and the fourth boundary tooth tip portion 127b (in the fourth tooth bottom forming range H4).

Specifically, the chain roller 2a is disposed on each of the fourth tooth bottom portions 130 between the third boundary tooth tip portion 127a and the fourth boundary tooth tip portion 127b in the fourth tooth bottom forming range H4, as in the first embodiment. In the fourth tooth bottom forming range H4, the position of the chain roller 2a (for example, center position P) is moved in a reverse direction of the sprocket drive rotation direction R and toward the rotational center axis X of the small-diameter rear sprocket 112 as it goes from the third boundary tooth tip portion 127a toward the fourth boundary tooth tip portion 127b. This movement is implemented by forming the fourth tooth bottom shape of the fourth tooth bottom portions 130 to be the above-described shape. It is thereby possible to intentionally displace the position of the chain roller 2a in the fourth tooth bottom portion 130 with respect to the position of a chain roller 2a located in the third tooth bottom portion 129.

The positional relationship between the chain roller 2a located in the third tooth bottom portion 129 and the chain roller 2a of the fourth tooth bottom portion 130 substantially corresponds to the positional relationship between the chain rollers 2a, 2a' shown in FIG. 4.

In the fourth tooth bottom portions 130 (fourth tooth bottom shape) in the fourth tooth bottom forming range H4, it is possible to increase the number of tooth bottom portions in which the chain roller 2a can be moved smoothly from the small-diameter rear sprocket 112 to the large-diameter rear sprocket 111, by changing the position (center position P) of the chain roller 2a in the manner as described above.

For example, in the case of a configuration in which the fourth sprocket teeth 126 of the small-diameter rear sprocket 112 are composed only of the third tooth bottom portions 129 (third tooth bottom shape), during an upward gear shifting operation, the chain roller 2a can be moved from the small-diameter rear sprocket 112 to the large-diameter rear sprocket 111 in two locations.

In this case, even if the large-diameter rear sprocket 111 and the small-diameter rear sprocket 112 are designed such that the chain roller 2a moves smoothly from the small-diameter rear sprocket 112 to the large-diameter rear sprocket 111 in one upward gear shift location, it is not be possible to smoothly move the chain roller 2a from the small-diameter rear sprocket 112 to the large-diameter rear sprocket 111 in the other upward gear shift location. As a result, a little shock may be generated during an upward gear shifting operation on the gear shift location 124.

On the other hand, in the present embodiment, as shown in FIG. 7, the fourth sprocket teeth 126 of the small-diameter rear sprocket 112 include the third tooth bottom portions 129 (third tooth bottom shape) and the fourth tooth bottom portions 130 (fourth tooth bottom shape), and it is therefore possible to, during an upward gear shifting operation, smoothly move the chain roller 2a from the small-diameter rear sprocket 112 to the large-diameter rear sprocket 111 in two locations, namely, the gear shift locations 123 and 124.

That is, during an upward gear shifting operation, the chain roller 2a can be suitably disposed in both of the gear shift locations 123 and 124. That is, in the two upward gear shift locations 123 and 124, the chain roller 2a can be moved smoothly from the small-diameter rear sprocket 112 to the large-diameter rear sprocket 111. With this configuration, in the small-diameter rear sprocket 112, the gear shifting performance of the upward gear shifting operation can be improved.

Other Embodiment

Although embodiments of the present invention have been described above, the present invention is not limited to the embodiments given above, and various modifications can be made without departing from the gist of the present invention. In particular, the embodiments given in this specification can be combined in any way as needed.

(a) In the first embodiment given above, an example is shown in which each of the second tooth bottom portions 20 (each second tooth bottom shape) includes a first arc portion 20a and a second arc portion 20b. Also, in the second embodiment given above, an example is shown in which each of the fourth tooth bottom portions 130 (each fourth tooth bottom shape) includes two types of arc portions as with the first embodiment.

Figure 8:
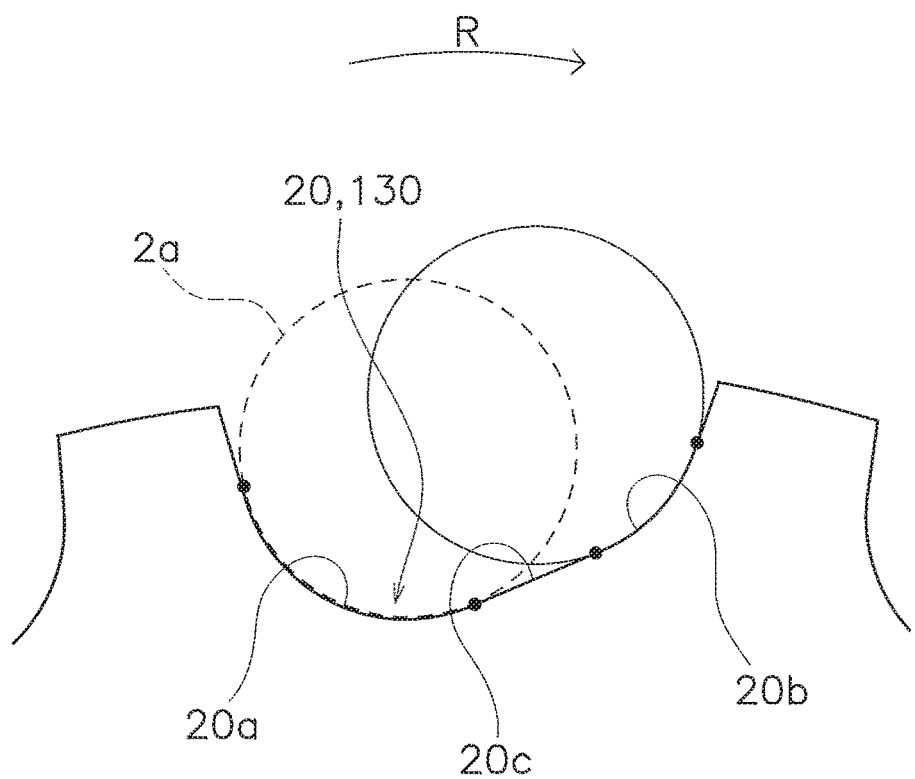
FIG. 8 is an enlarged side elevational view of rear sprocket teeth in accordance with another embodiment of the present invention.

Instead of this, as shown in FIG. 8, each of the second tooth bottom portions 20 (second tooth bottom shapes) and each of the fourth tooth bottom portions 130 (each fourth tooth bottom shape) can include a first arc portion 20a, a second arc portion 20b and a linear portion 20c. That is, the second tooth bottom portions 20 and the fourth tooth bottom portions 130 can include a linear portion.

In this case, the first arc portion 20a and the second arc portion 20b are configured to have the same configuration as those of the first and the second embodiments. The linear portion 20c is a portion that connects the first arc portion 20a and the second arc portion 20b. In this way, the position of the chain roller 2a on the second tooth bottom portions 20 and the fourth tooth bottom portions 130 can be intentionally displaced with respect to the position of the chain roller 2a located in the first tooth bottom portions 19 and the third tooth bottom portions 129, by further providing the linear portions 20c to the second tooth bottom portions 20 (second tooth bottom shapes) and to the fourth tooth bottom portions 130 (fourth tooth bottom shapes).

Figure 9:
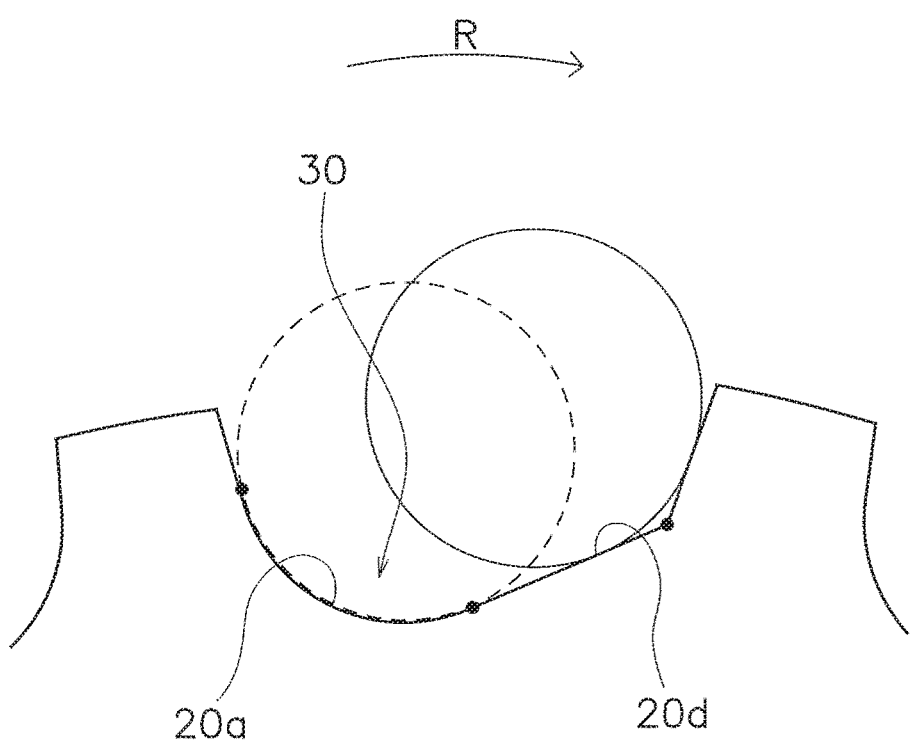
FIG. 9 is an enlarged side elevational view of rear sprocket teeth in accordance with another embodiment.

(b) In the first and second embodiments given above, an example is shown in which the tooth bottom portions 18, 128 include the first tooth bottom portions 19 (the third tooth bottom portions 129) and the second tooth bottom portions 20 (the fourth tooth bottom portions 130). Instead, as shown in FIG. 9, the tooth bottom portions 18, 128 may further include at least one fifth tooth bottom portion 30 (an example of a third tooth bottom portion).

In this case, the fifth tooth bottom portion 30 has a fifth tooth bottom shape (an example of a third tooth bottom shape). The fifth tooth bottom shape includes a first arc portion 20a and a linear portion 20d. The first arc portion 20a forms the fifth tooth bottom portion 30 on the upstream side of the sprocket drive rotation direction R. The linear portion 20d forms the fifth tooth bottom portion 30 on the downstream side of the sprocket drive rotation direction R. The position of the chain roller 2a on the fifth tooth bottom portion 30 can be intentionally displaced with respect to the position of the chain roller 2a located in the first tooth bottom portion 19 and the third tooth bottom portion 129, by forming the fifth tooth bottom portion 30 configured as described above.

(c) In the first embodiment given above, an example is shown in which the upward gear shift region 15 is provided in one location, but a plurality of upward gear shift regions 15 can be formed in the rear sprocket. In this case, it is preferable that at least one of the upward gear shift regions 15 is provided in the vicinity of the second tooth bottom portions 20.

(d) In the first and second embodiments given above, the configuration of the present invention was described by focusing on the large-diameter rear sprocket 11, 111 and the small-diameter rear sprocket 12, 112 included in the rear sprockets 10. The configuration described herein, for example, the configuration of the large-diameter rear sprocket 11 and the small-diameter rear sprocket 112 is applicable to other rear sprockets included in the plurality of rear sprockets 10.

(e) In the first embodiment and the second embodiment given above, only one of the large-diameter rear sprocket and the small-diameter rear sprocket has a plurality of tooth bottom shapes, but the present invention is not limited thereto. Both of the large-diameter rear sprocket and the small-diameter rear sprocket can have a plurality of tooth bottom shapes.

(f) The bicycle sprocket according to the present invention can have four or more different types of tooth bottom shapes. That is, the bicycle sprocket according to the present invention can have a fourth tooth bottom shape, a fifth tooth bottom shape, and more tooth bottom shapes. Also, the tooth bottom shapes are not limited to those shown in the examples of the present invention. It is possible to use any other shape as long as the shape allows the position of the chain roller 2a to be intentionally displaced with respect to the position of the chain roller 2a located in the first tooth bottom portion 19 and the third tooth bottom portion 129.

(g) In the embodiments given above, examples are shown in which the present invention is applied to the large-diameter rear sprocket 11 and the small-diameter rear sprocket 112, but the present invention may be applied to a front sprocket. That is, the present invention is also applicable to the front sprocket assembly 4.

The present invention is widely applicable to bicycle sprockets and bicycle sprocket assemblies.

What is claimed is:

1. A bicycle sprocket having a rotational center axis, the bicycle sprocket comprising:
    a sprocket body; and
    a plurality of sprocket teeth that extend outwardly in a radial direction with respect to the rotational center axis from the sprocket body, each of the plurality of sprocket teeth being separated by a gap;
    the sprocket teeth including a plurality of tooth tip portions and a plurality of tooth bottom portions, each of the tooth bottom portions being defined by a gap separating each of the plurality of sprocket teeth, each of the tooth bottom portions being located between a pair of the tooth tip portions that are adjacent to each other in a circumferential direction with respect to the rotational center axis;
    the tooth bottom portions including at least one tooth having a first tooth bottom portion with a first tooth bottom shape and at least one other tooth having a second tooth bottom portion with a second tooth bottom shape; and
    the first tooth bottom shape being different from the second tooth bottom shape.

2. The bicycle sprocket according to claim 1, wherein the second tooth bottom shape is formed such that a tooth bottom diameter on an upstream side with respect to a drive rotation direction of the bicycle sprocket is smaller than a tooth bottom diameter on a downstream side with respect to the drive rotation direction.

3. The bicycle sprocket according to claim 1, wherein the second tooth bottom portion includes a linear portion.

4. The bicycle sprocket according to claim 1, wherein the first tooth bottom shape is symmetric with respect to a tooth bottom center line extending in the radial direction.

5. The bicycle sprocket according to claim 1, wherein the second tooth bottom shape is asymmetric with respect to a tooth bottom center line extending in the radial direction.

6. The bicycle sprocket according to claim 1, wherein the tooth bottom portions includes a plurality of first tooth bottom portions.

7. The bicycle sprocket according to claim 6, wherein at least two of the first tooth bottom portions are disposed side by side in the circumferential direction.

8. The bicycle sprocket according to claim 1, wherein the tooth bottom portions includes a plurality of second tooth bottom portions.

9. The bicycle sprocket according to claim 8, wherein at least two of the second tooth bottom portions are disposed side by side in the circumferential direction.

10. The bicycle sprocket according to claim 1, wherein a total number of the first tooth bottom portions and a total number of the second tooth bottom portions are different from each other.

11. The bicycle sprocket according to claim 10, wherein the total number of the first tooth bottom portions is greater than the total number of the second tooth bottom portions.

12. The bicycle sprocket according to claim 1, further comprising
    an upward gear shift region that facilitates displacement of a bicycle chain from a small sprocket toward the bicycle sprocket, the small sprocket having less teeth than the bicycle sprocket and being adjacent to the bicycle sprocket in an axial direction that is parallel to the rotational center axis.

13. The bicycle sprocket according to claim 12, wherein the upward gear shift region includes a plurality of upward gear shift regions.

14. The bicycle sprocket according to claim 13, wherein at least one of the upward gear shift regions is provided in a vicinity of the second tooth bottom portions.

15. The bicycle sprocket according to claim 1, further comprising
    a downward gear shift region that facilitates displacement of a bicycle chain from the bicycle sprocket toward a small sprocket having less teeth than the bicycle sprocket, the small sprocket being adjacent to the bicycle sprocket in an axial direction that is parallel to the rotational center axis.

16. The bicycle sprocket according to claim 15, wherein the downward gear shift region includes a plurality of downward gear shift regions.

17. The bicycle sprocket according to claim 16, wherein at least one of the downward gear shift regions is provided in a vicinity of the second tooth bottom portions.

18. The bicycle sprocket according to claim 8, wherein the second tooth bottom portions are disposed sequentially in the circumferential direction.

19. The bicycle sprocket according to claim 1 wherein the tooth bottom portions include at least one third tooth bottom portion having a third tooth bottom shape.

20. The bicycle sprocket according to claim 1, wherein a total number of the sprocket teeth is equal to or less than twenty.

21. The bicycle sprocket according to claim 20, wherein the total number of the sprocket teeth is equal to or less than fifteen.

22. A bicycle sprocket assembly comprising the bicycle sprocket according to claim 1, and further comprising an additional sprocket disposed adjacent the bicycle sprocket in an axial direction that is parallel to the rotational center axis.

23. The bicycle sprocket assembly according to claim 22, wherein
the bicycle sprocket is a rear sprocket.

24. The bicycle sprocket assembly according to claim 22, wherein
the bicycle sprocket is a front sprocket.

* * * * *